(12) United States Patent
Morisaki et al.

(10) Patent No.: US 11,815,015 B2
(45) Date of Patent: Nov. 14, 2023

(54) GAS TURBINE SYSTEM AND MOVING BODY INCLUDING THE SAME

(71) Applicant: MITSUBISHI HEAVY INDUSTRIES, LTD., Tokyo (JP)

(72) Inventors: Yuki Morisaki, Tokyo (JP); Kazuhiro Imai, Tokyo (JP); Masayuki Oda, Tokyo (JP); Yuichi Nakatani, Tokyo (JP); Yasuhiro Saiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/625,949

(22) PCT Filed: Feb. 13, 2020

(86) PCT No.: PCT/JP2020/005601
§ 371 (c)(1),
(2) Date: Jan. 10, 2022

(87) PCT Pub. No.: WO2021/009952
PCT Pub. Date: Jan. 21, 2021

(65) Prior Publication Data
US 2022/0243652 A1 Aug. 4, 2022

(30) Foreign Application Priority Data
Jul. 12, 2019 (JP) .................. 2019-130168

(51) Int. Cl.
*F02C 7/04* (2006.01)
*F02C 6/08* (2006.01)
(Continued)

(52) U.S. Cl.
CPC ............. *F02C 6/08* (2013.01); *F02C 7/04* (2013.01); *F01D 15/10* (2013.01); *F02C 1/04* (2013.01);
(Continued)

(58) Field of Classification Search
CPC ...... F02C 6/08; F02C 7/04; F02C 1/04; F02C 3/04; F01D 15/10; F05D 2220/323; F05D 2220/76; F05D 2240/35
See application file for complete search history.

(56) References Cited

U.S. PATENT DOCUMENTS

2011/0072828 A1    3/2011    Winter et al.
2013/0098052 A1    4/2013    Bedrine et al.
(Continued)

FOREIGN PATENT DOCUMENTS

JP    2013-529756    7/2013
JP    2015-536396    12/2015
JP    2016-135671    7/2016

OTHER PUBLICATIONS

International Search Report dated Apr. 7, 2020 in corresponding International Application No. PCT/JP2020/005601.
(Continued)

*Primary Examiner* — Steven M Sutherland
(74) *Attorney, Agent, or Firm* — Wenderoth, Lind and Ponack, L.L.P.

(57) ABSTRACT

Provided is a gas turbine system that is used for a moving body including a thrust generator configured to generate thrust from electric power and includes: a combustor that burns a compressed air generated by a compressor together with fuel to generate a combustion gas; a turbine driven by the combustion gas generated by the combustor; a generator that is coupled to the turbine to generate electric power by driving of the turbine and supplies electric power to the thrust generator; a turbocharger that guides external air to the compressor; and an exhaust unit that guides a combustion gas that passed through the turbine to the outside, and the turbocharger is driven by a part of a combustion gas guided to the exhaust unit or by external air heated by heat exchange with a part of a combustion gas guided to the exhaust unit.

11 Claims, 9 Drawing Sheets

(51) Int. Cl.
*F01D 15/10* (2006.01)
*F02C 1/04* (2006.01)
*F02C 3/04* (2006.01)

(52) U.S. Cl.
CPC .......... *F02C 3/04* (2013.01); *F05D 2220/323* (2013.01); *F05D 2220/76* (2013.01); *F05D 2240/35* (2013.01)

(56) References Cited

U.S. PATENT DOCUMENTS

| | | |
|---|---|---|
| 2014/0250898 A1 | 9/2014 | Mackin et al. |
| 2015/0233294 A1 | 8/2015 | Howes |
| 2016/0214727 A1 | 7/2016 | Hamel et al. |
| 2017/0370284 A1 | 12/2017 | Harvey et al. |
| 2018/0050806 A1 | 2/2018 | Kupiszewski et al. |
| 2018/0178920 A1* | 6/2018 | Swann ...................... F02K 5/00 |
| 2018/0209338 A1 | 7/2018 | Alecu |
| 2018/0304753 A1* | 10/2018 | Vondrell ................. B64C 21/06 |

OTHER PUBLICATIONS

Written Opinion of the International Searching Authority dated Apr. 7, 2020 in corresponding International Application No. PCT/JP2020/005601 (with English translation).
Office Action dated Jul. 29, 2023 in corresponding German Patent Application No. 11202000334.1, with English-language translation.

\* cited by examiner

GAS TURBINE SYSTEM AND MOVING BODY INCLUDING THE SAME

TECHNICAL FIELD

The present disclosure relates to a gas turbine system used for a moving body including a thrust generator that generates thrust from electric power and also relates to a moving body including such a gas turbine system.

BACKGROUND ART

Conventionally, gas turbine engines used for aircrafts and including a compressor unit, a combustor unit, a turbine unit, a rotator that rotates with the turbine unit, and a fan that rotates in response to motion of the rotator to generate thrust have been known (for example, see Patent Literature 1). The gas turbine engine disclosed in Patent Literature 1 is provided with a generator that rotates with a fan and thereby converts kinetic energy caused by rotation of the fan into electric power. The electric power generated by the generator is used for driving an electric fan or the like arranged at the rear end of an aircraft.

CITATION LIST

Patent Literature

[PTL 1]
U. S. Patent Application Publication No. 2018/0050806

SUMMARY OF INVENTION

Technical Problem

The gas turbine engine disclosed in Patent Literature 1 converts energy of a combustion gas generated by a combustor unit into electric power via the generator that rotates with the turbine unit. However, since a combustion gas that has passed through the turbine unit is directly discharged to outside, it is not possible to effectively utilize a part of kinetic energy and thermal energy of the combustion gas. In particular, when the gas turbine engine is not provided with a fan and thrust is generated by only the electric fan driven with electric power generated by the generator, a combustion gas discharged from the gas turbine engine is not used as thrust. Thus, a part of kinetic energy or thermal energy of the combustion gas may be wasted.

The present disclosure has been made in view of such circumstances, and an object is to, in a gas turbine system used for a moving body including a generator that generates electric power by driving of a turbine and a thrust generator that generates thrust from electric power, effectively utilize kinetic energy or thermal energy of a combustion gas used for the driving of the turbine.

Solution to Problem

To achieve the object described above, a gas turbine system according to one aspect of the present disclosure is used for a moving body including a thrust generator configured to generate thrust from electric power, and the gas turbine system includes: a compressor that compresses external air to generate compressed air; a combustor that burns the compressed air generated by the compressor together with fuel to generate a combustion gas; a turbine driven by the combustion gas generated by the combustor; a generator that is coupled to the turbine to generate electric power by driving of the turbine and supplies electric power to the thrust generator; a thrust generator that generates thrust from electric power generated by the generator; a turbocharger that guides external air to the compressor; and an exhaust unit that guides a combustion gas that passed through the turbine to outside, and the turbocharger is driven by a part of a combustion gas guided to the exhaust unit or by external air heated by heat exchange with a part of a combustion gas guided to the exhaust unit.

Advantageous Effects of Invention

According to the present disclosure, in a gas turbine system used for a moving body including a generator that generates electric power by driving of a turbine and a thrust generator that generates thrust from electric power, kinetic energy or thermal energy of a combustion gas used for the driving of the turbine can be effectively utilized.

DESCRIPTION OF EMBODIMENTS

First Embodiment

Figure 1:
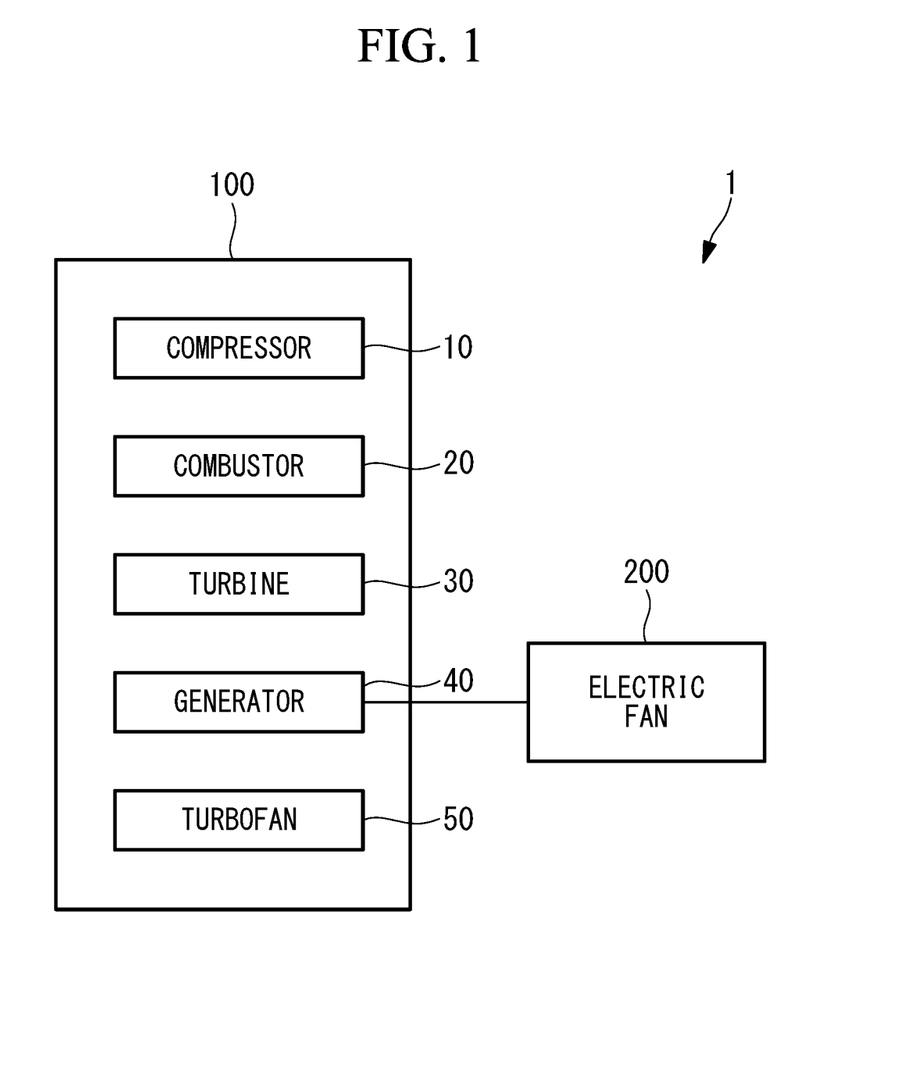
FIG. 1 is a schematic configuration diagram illustrating an aircraft according to a first embodiment of the present disclosure.
Figure 2:
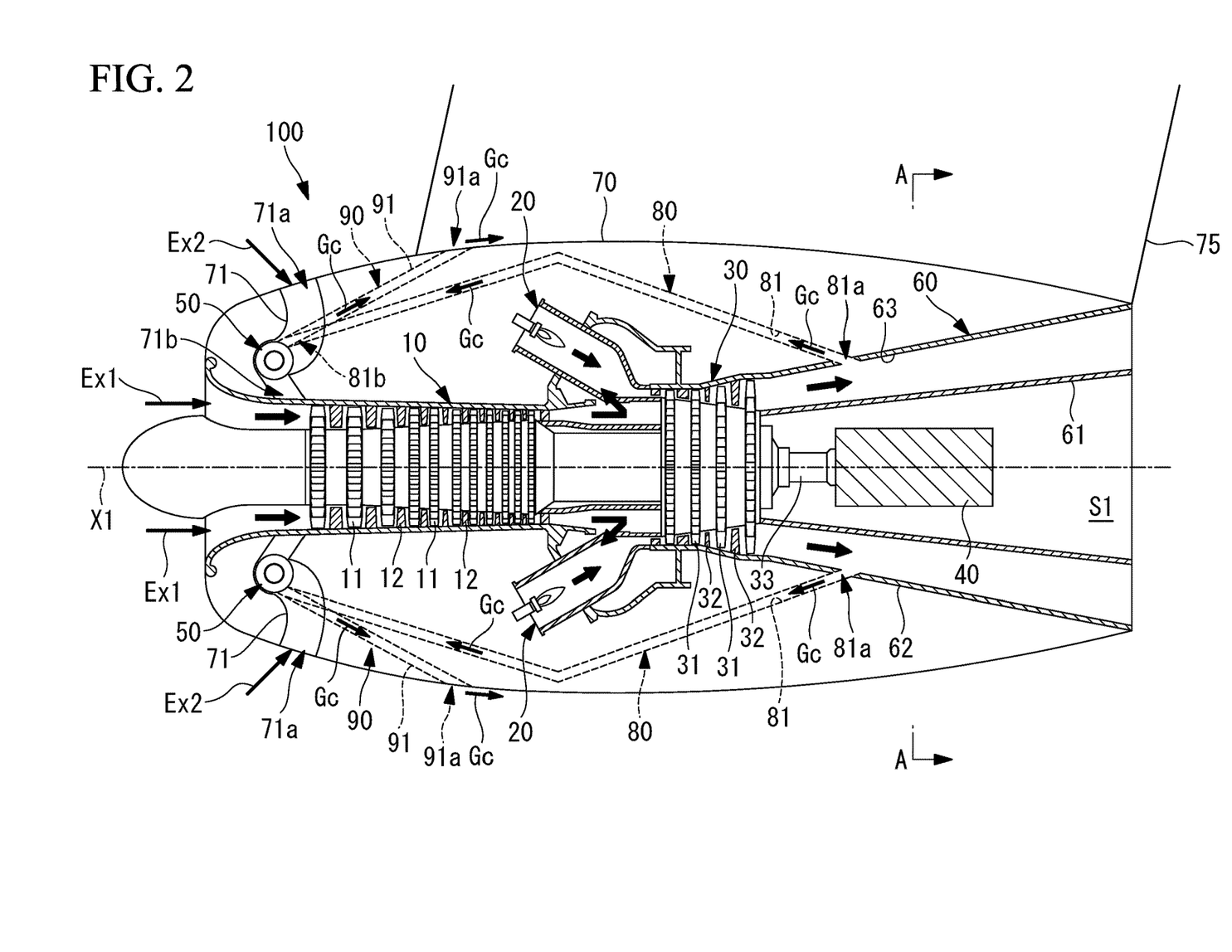
FIG. 2 is a longitudinal sectional view of a gas turbine system illustrated in FIG. 1.
Figure 3:
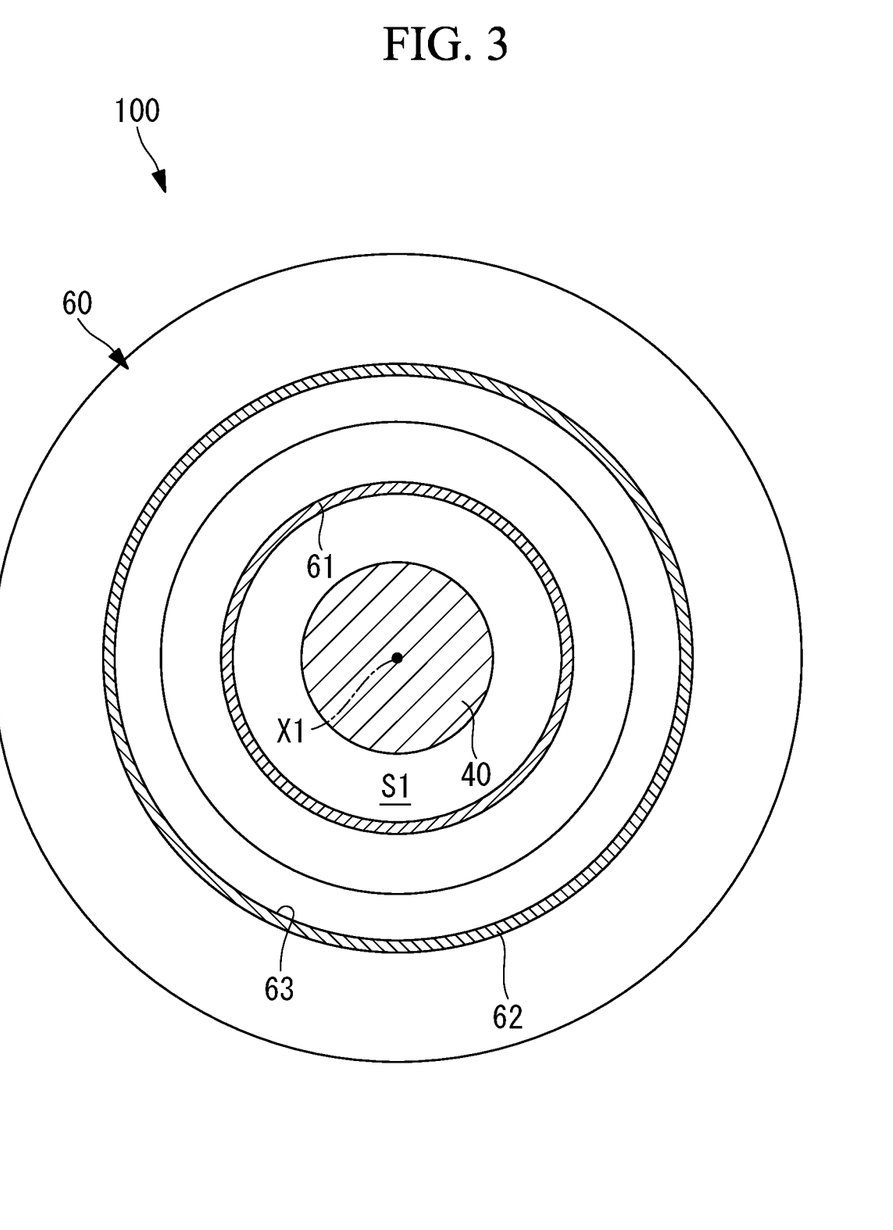
FIG. 3 is a sectional view taken along a line A-A of the gas turbine system illustrated in FIG. 2.
Figure 4:
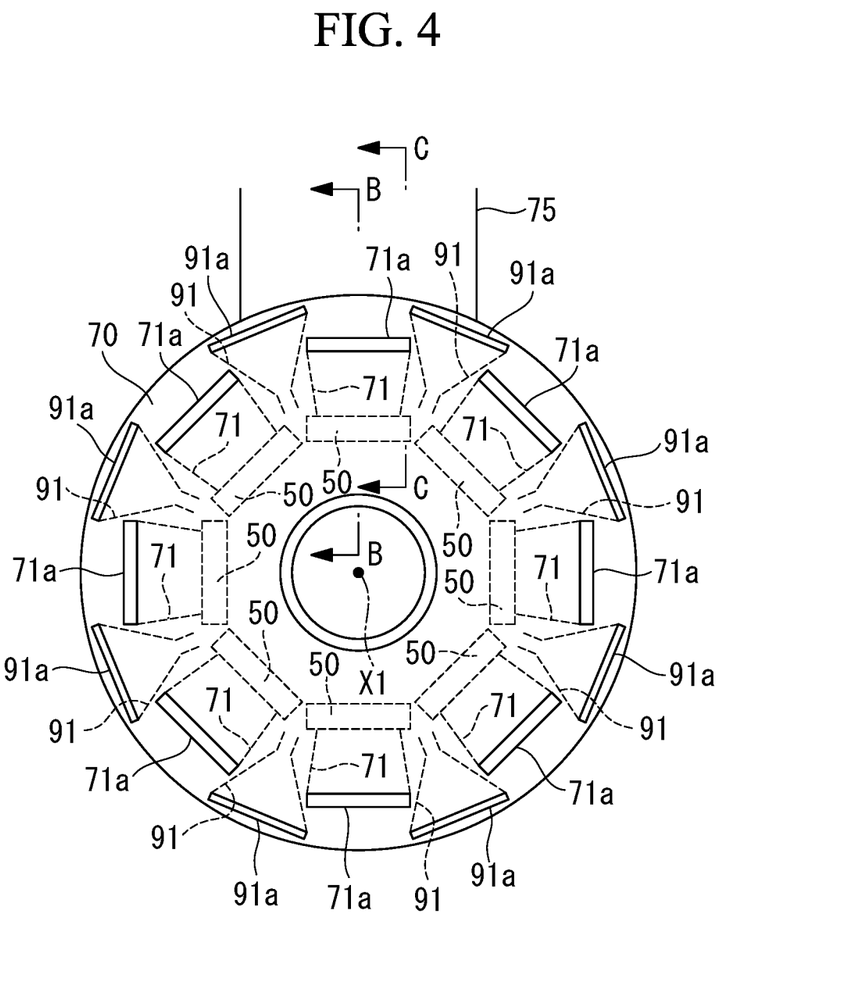
FIG. 4 is a front view of the gas turbine system illustrated in FIG. 2.

An aircraft (moving body) 1 according to a first embodiment of the present disclosure will be described below with reference to the drawings. FIG. 1 is a schematic configuration diagram illustrating the aircraft 1 according to the first embodiment of the present disclosure. FIG. 2 is a longitudinal sectional view of a gas turbine system 100 illustrated in FIG. 1. FIG. 3 is a sectional view taken along a line A-A of the gas turbine system 100 illustrated in FIG. 2. FIG. 4 is a front view of the gas turbine system 100 illustrated in FIG. 2.

As illustrated in FIG. 1, the aircraft 1 includes a gas turbine system 100 that generates electric power and an electric fan (thrust generator) 200 that generates thrust from electric power generated by the gas turbine system 100. The aircraft 1 of the present embodiment is an apparatus that drives the electric fan 200 to obtain thrust by using electric power generated by the gas turbine system 100.

As illustrated in FIG. 1 and FIG. 2, the gas turbine system 100 includes a compressor 10, combustors 20, a turbine 30, a generator 40, turbochargers 50, an exhaust unit 60, a nacelle (shell) 70, bypass units 80, and exit units 90. As illustrated in FIG. 1, electric power generated by the generator 40 is supplied to the electric fan 200.

The compressor 10 is a device that compresses external air flowing therein from the front in the traveling direction of the aircraft 1 to generate compressed air. The compressor 10 has a plurality of rotor blades 11 that rotate about an axis line X1 and a plurality of fixed stator blades 12 and generates compressed air by passing inflow air through the plurality of rotor blades 11 and the plurality of stator blades 12.

Each combustor 20 is a device that burns compressed air generated by the compressor 10 together with fuel to generate a high-temperature and high-pressure combustion gas. The combustor 20 rotates the turbine 30 about the axis line X1 by supplying a high-temperature and high-pressure combustion gas to the turbine 30. The combustors 20 are provided at a plurality of portions about the axis line X1.

The turbine 30 is a device driven by a combustion gas generated by the combustor 20. The turbine 30 has a plurality of rotor blades 31 that rotate about the axis line X, a plurality of fixed stator blades 32, and a drive shaft 33 coupled to the rotor blades. A combustion gas is passed through the plurality of rotor blades 31 and the plurality of stator blades 32, and thereby the rotor blades 31 rotate about the axis line X1. The driving force obtained by rotation of the rotor blades 31 is transmitted to the generator 40 via the drive shaft 33.

The generator 40 is a device that is coupled to the drive shaft 33 of the turbine 30 and generates electric power by driving force of the turbine 30. The generator 40 has a rotor (not illustrated) that is coupled to the drive shaft 33 and rotates about the axis line X1 and a stator fixed and arranged around the rotor. As illustrated in FIG. 1, electric power generated by the generator 40 is supplied to the electric fan 200.

The electric fan 200 is a device that generates thrust from electric power generated by the generator 40. The electric fan 200 can be installed at any position away from the gas turbine system 100 in the aircraft 1. The electric fan 200 rotates a fan (not illustrated) to obtain thrust.

Each turbocharger 50 is a device that forcibly guides external air to the compressor 10. The turbocharger 50 is driven by a part of a combustion gas Gc guided to the exhaust unit 60 after passing through the turbine 30. A part of a combustion gas is guided to the turbocharger 50 by the bypass unit 80. The turbocharger 50 of the present embodiment is a crossflow fan in which an impeller having blades shaped uniformly in the rotation axis direction is rotated about the rotation axis to draw air into the impeller and then discharge the air. By forcibly guiding external air to the compressor 10 by the turbocharger 50, it is possible to improve the efficiency of the gas turbine system 100.

As illustrated in FIG. 2, the exhaust unit 60 guides a combustion gas that has passed through the turbine 30 to outside. The exhaust unit 60 has an inner wall member 61 and an outer wall member 62. The inner wall member 61 extends along the axis line X1, about which the turbine 30 rotates, and is formed in a cylindrical shape about the axis line X1. The outer wall member 62 is formed in a cylindrical shape and extends along the axis line X1 and arranged so as to surround the outer circumference side of the inner wall member 61.

As illustrated in FIG. 3, the inner wall member 61 and the outer wall member 62 form an annular channel 63 through which a combustion gas discharged from the turbine 30 flows and which extends along the axis line X1. The annular channel 63 is a channel formed annularly about the axis line X1 and guides a combustion gas discharged from the turbine 30 to the outside.

As illustrated in FIG. 2 and FIG. 3, an accommodation space S1 surrounded by the inner wall member 61 is formed on the inner circumference side of the inner wall member 61 with respect to the axis line X1. The generator 40 is arranged in the accommodation space S1. The generator 40 is fixed to the inner wall member 61 via a fastener (not illustrated).

The nacelle 70 is a shell arranged so as to cover respective components of the gas turbine system 100 including the compressor 10, the combustors 20, the turbine 30, and the exhaust unit 60. The nacelle 70 is formed in a cylindrical shape extending along the axis line X1. The nacelle 70 is coupled to a fuselage (not illustrated) via a pylon 75. As illustrated in FIG. 2, the nacelle 70 is provided with turbocharger channels 71 that guide external air to the compressor 10 via the turbochargers 50. Through the turbocharger channel 71, outside air flowing in from an outside air inlet port 71a is guided to the compressor 10 from an outside air supply port 71b.

Each bypass unit 80 is a device having a bypass channel 81 through which a part of the combustion gas Gc guided into the exhaust unit 60 is guided to the turbocharger 50. As illustrated in FIG. 2, a high-temperature and high-pressure combustion gas Gc flowing through the exhaust unit 60 flows into the bypass channel 81 from an intake part 81a. Through the bypass channel 81, the combustion gas Gc flowing in from the intake part 81a is guided to a supply part 81b, and the combustion gas Gc is supplied to the turbocharger 50. The turbocharger 50 is driven by the combustion gas Gc guided by the bypass unit 80.

Each exit unit 90 is a device having an exit channel 91 through which the combustion gas Gc that has been guided to the turbocharger 50 by the bypass unit 80 is guided to a discharge port 91a provided in the surface of the nacelle 70. The combustion gas Gc guided to the turbocharger 50 flows into the exit channel 91 and is then discharged from the discharge port 91a to the outside. Since the discharge port 91a is provided in the surface of the nacelle 70, the combustion gas Gc flowing out of the discharge port 91a flows toward downstream in the flow direction of external air along the surface of the nacelle 70. Accordingly, boundary layer control takes place on the surface of the nacelle 70, and it is thus possible to suppress a failure such as separation of the external air flow from the surface of the nacelle 70 or otherwise turbulence of the external air flow.

Figure 5:
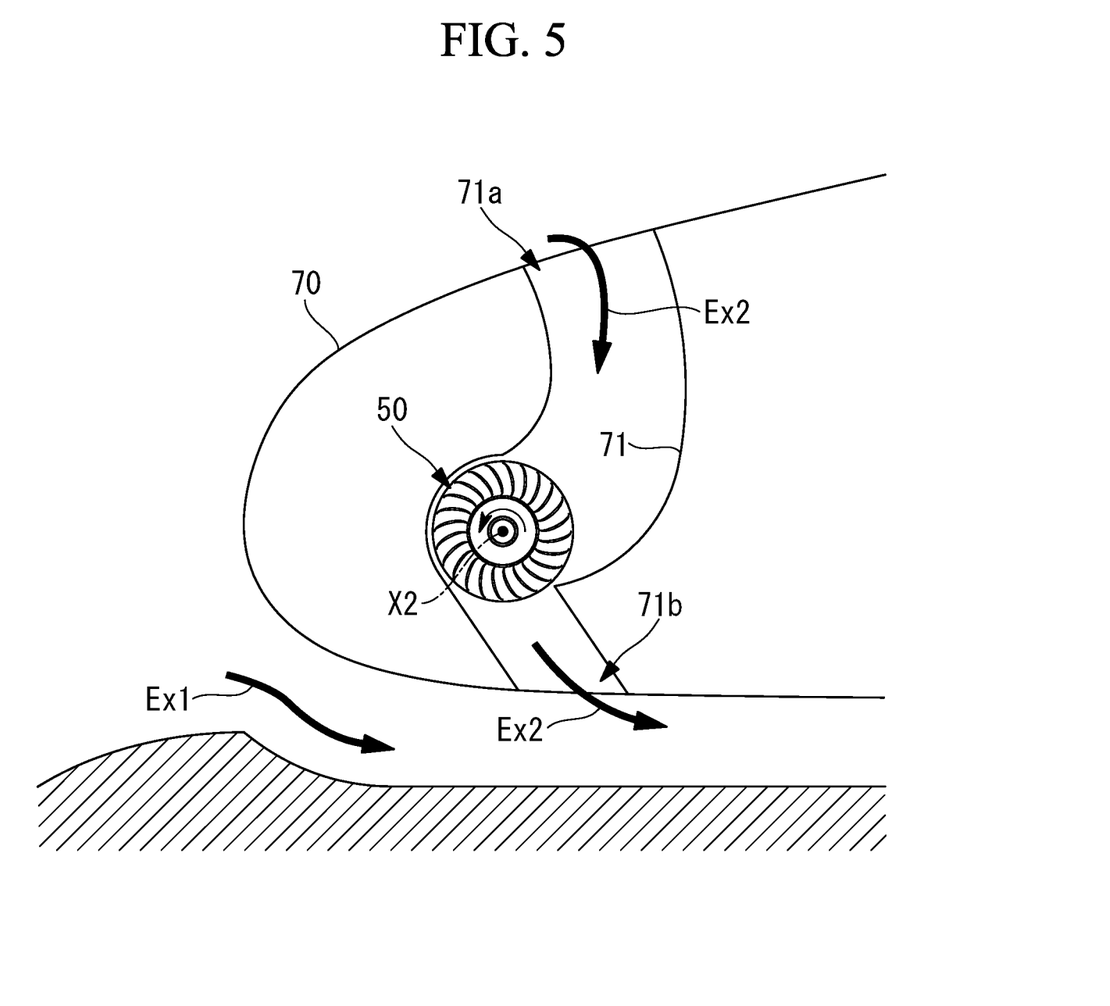
FIG. 5 is a sectional view taken along a line B-B of the gas turbine system illustrated in FIG. 4.
Figure 6:
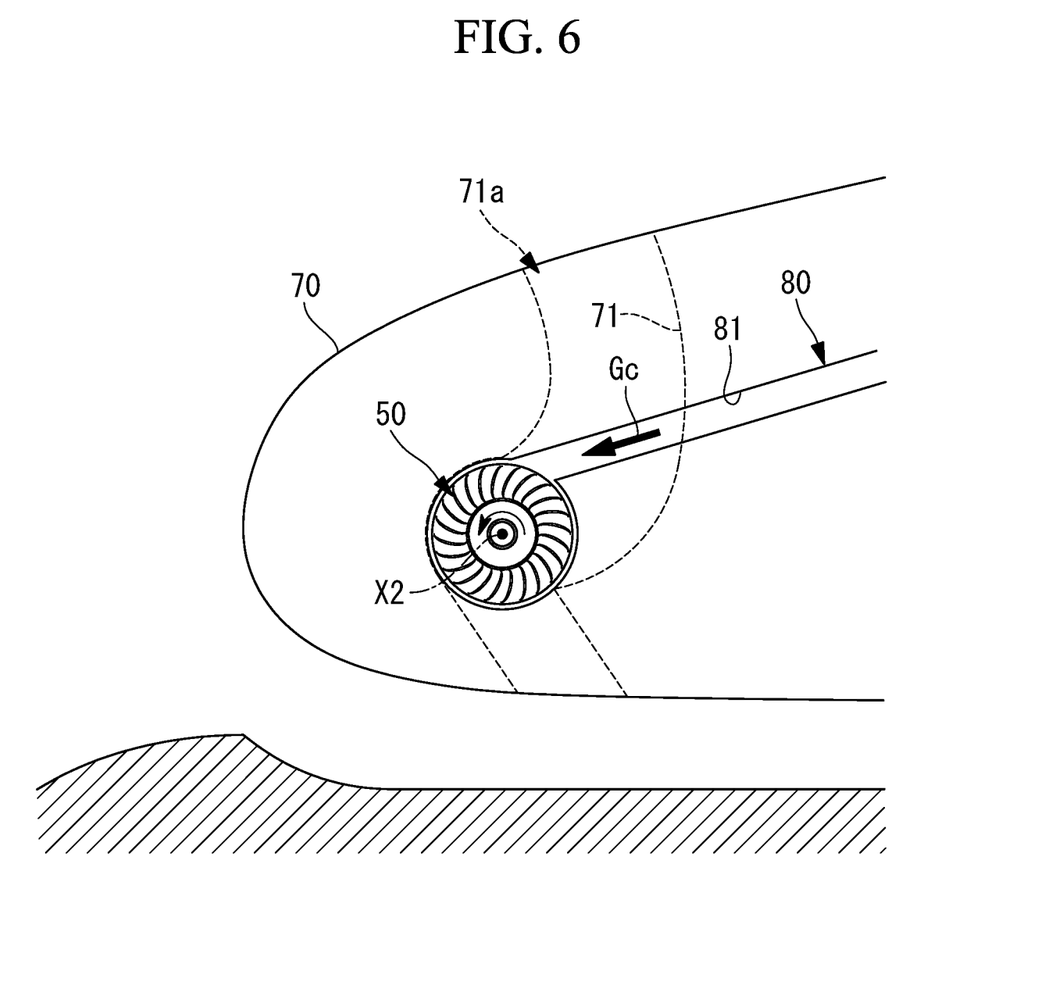
FIG. 6 is a sectional view taken along a line C-C of the gas turbine system illustrated in FIG. 4.
Figure 7:
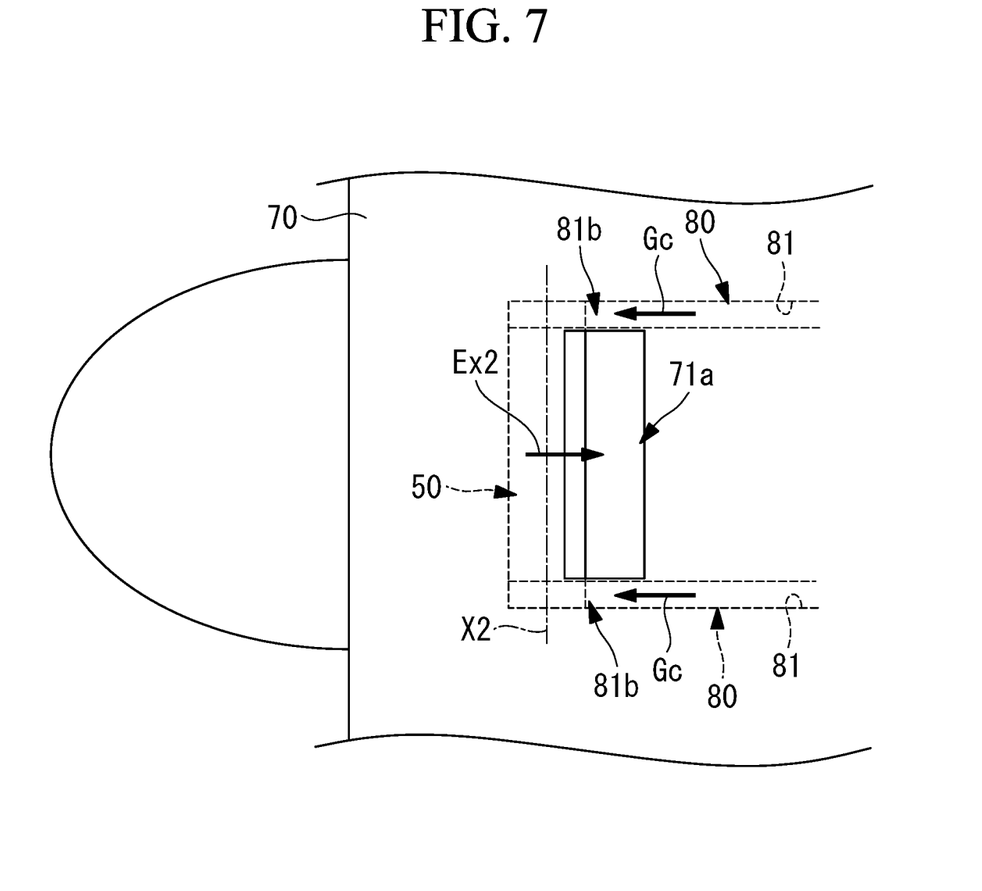
FIG. 7 is a plan view of the gas turbine system illustrated in FIG. 5 when viewed from above.

A mechanism to forcibly guide external air to the compressor 10 by the turbocharger 50 will now be described in detail with reference to the drawings. FIG. 5 is a sectional view taken along a line B-B of the gas turbine system 100 illustrated in FIG. 4. FIG. 6 is a sectional view taken along a line C-C of the gas turbine system 100 illustrated in FIG. 4. FIG. 7 is a plan view of the gas turbine system 100 illustrated in FIG. 5 when viewed from above.

As illustrated in the front view of FIG. 4, the turbochargers 50 are provided at a plurality of portions (8 portions at 45-degree intervals in the example illustrated in FIG. 4) about the axis line X1. Further, the outside air inlet ports 71a from which external air is caused to flow into the turbochargers channels 71 where the turbochargers 50 are arranged are provided at a plurality of portions about the axis line X1 so as to correspond to the plurality of turbochargers

50. Further, the discharge ports 91a from which the combustion gas that has passed through the turbochargers 50 is discharged to the outside are provided at a plurality of portions (8 portions at 45-degree intervals in the example illustrated in FIG. 4) about the axis line X1.

As illustrated in FIG. 5, the turbocharger 50 is rotated about an axis line X2 in the anticlockwise direction illustrated by the arrow in FIG. 5 and thereby guides outside air near the outside air inlet port 71a to the turbocharger channel 71. External air Ex2 taken in the turbocharger 50 is discharged to the outside air supply port 71b. The external air Ex2 discharged to the outside air supply port 71b is guided to the compressor 10 together with external air Ex1 introduced from the front of the nacelle 70.

As illustrated in FIG. 6, the combustion gas Gc flowing through the bypass channel 81 of the bypass unit 80 is guided to the turbocharger 50 and rotates the turbocharger 50 about the axis line X2. As illustrated in FIG. 7, the combustion gas Gc is guided to both ends of the axis line X2 that is the rotation axis of the turbocharger 50. The combustion gas Gc that has passed through the turbocharger 50 is guided to the exit channel 91 of the exit unit 90 and flows out of the discharge port 91a to the surface of the nacelle 70. The turbocharger 50 is driven by the combustion gas Gc to rotate about the axis line X2 and guide the external air Ex2 from the outside air inlet port 71a to the turbocharger channel 71.

The effects and advantages achieved by the aircraft 1 of the present embodiment described above will be described.

The aircraft 1 according to the present disclosure includes the compressor 10 that compresses external air Ex2 to generate compressed air, the combustor 20 that burns the compressed air generated by the compressor 10 together with fuel to generate a combustion gas Gc, the turbine 30 driven by the combustion gas Gc generated by the combustor 20, the generator 40 that is coupled to the turbine 30 and generates electric power by driving of the turbine 30, the electric fan 200 that generates thrust from electric power generated by the generator 40, and an exhaust unit 60 that guides the combustion gas Gc that has passed through the turbine 30 to the outside, and the turbocharger 50 is driven by a part of the combustion gas Gc guided to the exhaust unit 60.

According to the aircraft 1 of the present disclosure, the turbine 30 is driven by the combustion gas Gc generated by the combustor 20, and the generator 40 coupled to the turbine 30 generates electric power by the driving of the turbine 30. The electric fan 200 generates thrust by using electric power generated by the generator 40 and thus can impel the aircraft 1. Further, the turbocharger 50 is driven by the combustion gas Gc that has driven the turbine 30, and external air is forcibly guided to the compressor 10. It is therefore possible to effectively utilize kinetic energy of a combustion gas used for the driving of the turbine and improve the efficiency of the gas turbine system 100.

The aircraft 1 according to the present disclosure includes the bypass unit 80 that guides a part of the combustion gas guided to the exhaust unit 60 to the turbocharger 50, and the turbocharger 50 is driven by the combustion gas Gc guided by the bypass unit 80. According to the aircraft 1 of the present disclosure, it is possible to drive the turbocharger 50 by guiding a part of the combustion gas, which has been guided to the exhaust unit 60, to the turbocharger 50 by the bypass unit 80.

The aircraft 1 according to the present disclosure includes the nacelle 70 arranged so as to cover the compressor 10, the combustor 20, the turbine 30, and the exhaust unit 60 and the exit unit 90 configured to guide a combustion gas guided to the turbocharger 50 by the bypass unit 80 to the discharge port 91a provided in the surface of the nacelle 70.

Since the discharge port 91a is provided in the surface of the nacelle 70, the combustion gas Gc flowing out of the discharge port 91a flows toward downstream in the flow direction of external air along the surface of the nacelle 70. Accordingly, boundary layer control takes place on the surface of the nacelle 70, and it is thus possible to suppress a failure such as separation of the external air flow from the surface of the nacelle 70 or otherwise turbulence of the external air flow.

Second Embodiment

Next, an aircraft according to a second embodiment of the present disclosure will be described. The present embodiment is a modified example of the first embodiment and is assumed to be the same as the first embodiment unless particularly described below, and the description thereof will be omitted below.

The gas turbine system 100 included in the aircraft of the first embodiment effectively utilizes kinetic energy of a combustion gas used for driving of the turbine 30 by guiding a part of a combustion gas guided to the exhaust unit 60 to the turbocharger 50 to drive the turbocharger 50. In contrast, a gas turbine system 100A included in the aircraft of the present embodiment guides a part of a combustion gas guided to the exhaust unit 60 to a heat exchanger 95 to heat external air and generate heated air and guides the heated air to the turbocharger 50 to drive the turbocharger 50. Accordingly, it is possible to effectively utilize thermal energy of a combustion gas used for the driving of the turbine 30.

Figure 8:
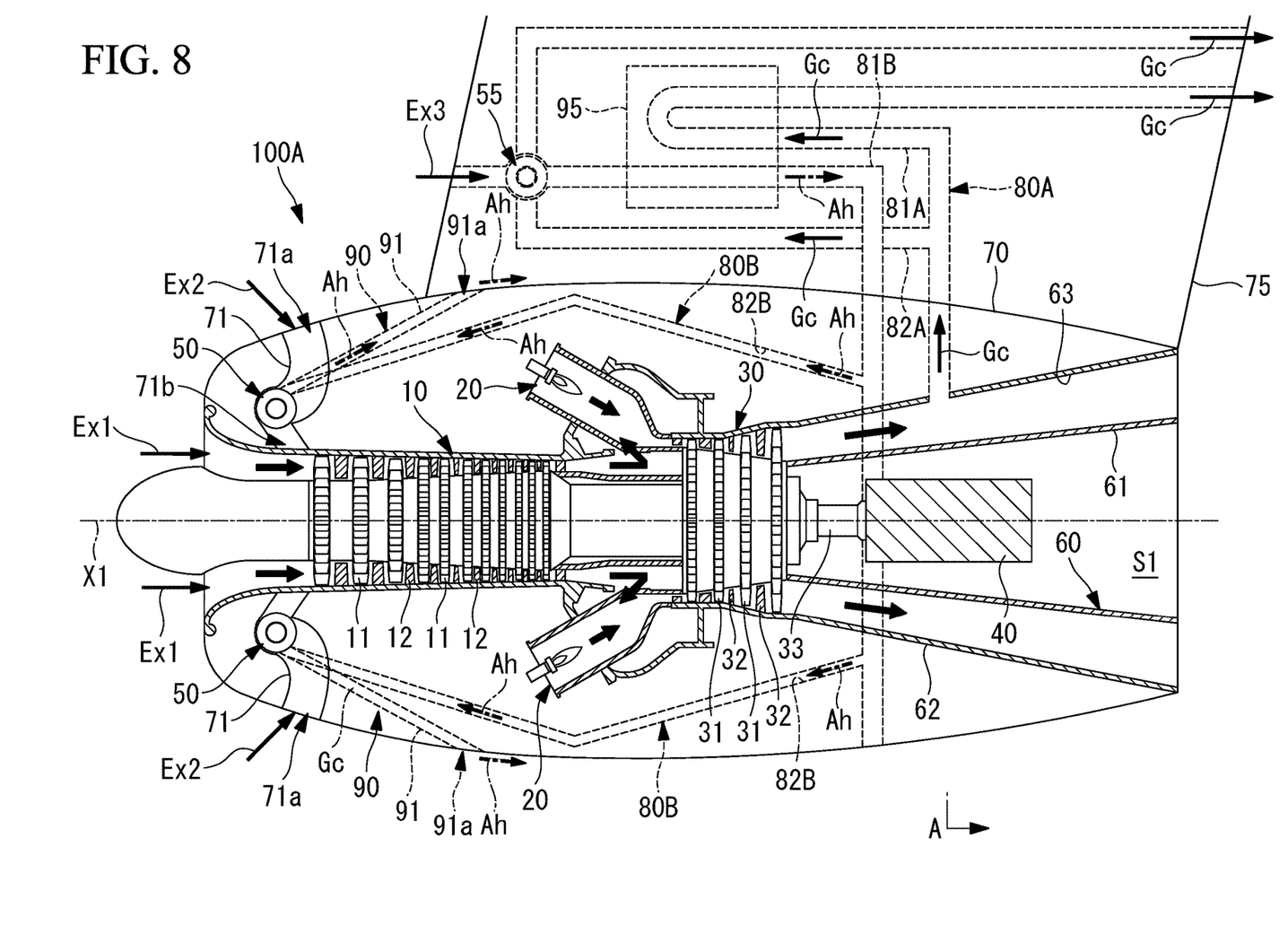
FIG. 8 is a longitudinal sectional view of a gas turbine system according to a second embodiment of the present disclosure.

The aircraft (moving body) according to the second embodiment of the present disclosure will be described below with reference to the drawings. FIG. 8 is a longitudinal sectional view of the gas turbine system 100A according to the second embodiment of the present disclosure.

The gas turbine system 100A of the present embodiment includes the compressor 10, the combustor 20, the turbine 30, the generator 40, the turbochargers 50, an intake fan 55, the exhaust unit 60, the nacelle 70, a bypass unit 80A, introduction units 80B, the exit units 90, and the heat exchanger 95.

Since the compressor 10, the combustor 20, the turbine 30, the generator 40, the turbocharger 50, the exhaust unit 60, the nacelle 70, and the exit unit 90 are the same as those of the first embodiment, the description thereof will be omitted below. As illustrated in FIG. 8, it is assumed that the intake fan 55, the bypass unit 80A, a part of the introduction unit 80B, and the heat exchanger 95 are accommodated inside a pylon 75. Note that the intake fan 55, the bypass unit 80A, and the heat exchanger 95 may be accommodated in a place other than the pylon 75 (for example, inside the fuselage of the aircraft 1).

The intake fan 55, the bypass unit 80A, the introduction unit 80B, and the heat exchanger 95 will be described below.

The intake fan 55 is a device that forcibly guides the external air Ex3 used for driving the turbocharger 50 to the heat exchanger 95. The intake fan 55 is driven by a part of the combustion gas Gc guided to the exhaust unit 60 after passing through the turbine 30. A part of the combustion gas Gc is guided to the intake fan 55 by the bypass unit 80A. The intake fan 55 of the present embodiment is a crossflow fan in which an impeller having blades shaped uniformly in the rotation axis direction is rotated about the rotation axis to draw air into the impeller and then discharge the air.

The bypass unit 80A is a device having a bypass channel 81A through which a part of the combustion gas Gc guided to the exhaust unit 60 is guided to the heat exchanger 95 and a bypass channel 82A through which another part of the combustion gas Gc guided to the exhaust unit 60 is guided to the intake fan 55. As illustrated in FIG. 8, the high-temperature and high-pressure combustion gas Gc passing through the exhaust unit 60 flows into the bypass unit 80A and is divided into a part flowing into the bypass channel 81A and a part flowing into the bypass channel 82A.

Through the bypass channel 81A, the combustion gas Gc flowing in from the exhaust unit 60 is guided to the heat exchanger 95, and the combustion gas Gc heat-exchanged with the external air Ex3 by the heat exchanger 95 is discharged to the outside. Through the bypass channel 82A, the combustion gas Gc flowing in from the exhaust unit 60 is guided to the intake fan 55, and the combustion gas Gc that has driven the intake fan 55 is discharged to the outside. In such a way, the thermal energy of a part of the combustion gas Gc passing through the turbine 30 and guided to the exhaust unit 60 is utilized for heating the external air Ex3 in the heat exchanger 95. Further, the kinetic energy of a part of the combustion gas Gc passing through the turbine 30 and guided to the exhaust unit 60 is utilized for driving the intake fan 55.

The introduction unit 80B is a device that guides, to the turbocharger 50, heated air Ah generated after the external air Ex3 is heated with the combustion gas Gc at the heat exchanger 95. The introduction unit 80B has a first channel 81B and a second channel 82B. The first channel 81B is a channel through which the external air Ex3 that has passed through the intake fan 55 is guided to the heat exchanger 95 and the heated air Ah generated by the heat exchanger 95 is guided into the nacelle 70. The second channel 82B supplies the turbocharger 50 with the heated air Ah supplied from the first channel 81B. The turbocharger 50 is driven by the heated air Ah guided through the second channel 82B.

The exit unit 90 is a device having the exit channel 91 through which the heated air Ah guided by the introduction unit 80B to the turbocharger 50 is guided to the discharge port 91a provided in the surface of the nacelle 70. The heated air Ah guided to the turbocharger 50 flows into the exit channel 91 and is discharged from the discharge port 91a to the outside. Since the discharge port 91a is provided in the surface of the nacelle 70, the heated air Ah flowing out of the discharge port 91a flows toward downstream in the flow direction of external air along the surface of the nacelle 70. Accordingly, boundary layer control takes place on the surface of the nacelle 70, and it is thus possible to suppress a failure such as separation of the external air flow from the surface of the nacelle 70 or otherwise turbulence of the external air flow.

The heat exchanger 95 is a device that exchanges heat between the external air Ex3 discharged from the intake fan 55 and the combustion gas Gc supplied through the bypass channel 81A. The heat exchanger 95 generates the heated air Ah by heating the external air Ex3 with the combustion gas Gc.

The effects and advantages achieved by the aircraft 1 of the present embodiment described above will be described.

The aircraft 1 according to the present disclosure includes the heat exchanger 95 that exchanges heat between the external air Ex3 and the combustion gas Gc, the intake fan 55 that guides the external air Ex3 to the heat exchanger 95, the bypass unit 80A that guides a part of the combustion gas Gc guided to the exhaust unit 60 to the heat exchanger 95, and the introduction unit 80B that guides, to the turbocharger 50, the heated air Ah generated by heating the external air Ex3 with the combustion gas at the heat exchanger 95, and the turbocharger 50 is driven by the heated air Ah guided from the introduction unit 80B.

According to the aircraft 1 of the present disclosure, due to the combustion gas Gc that has passed through the turbine 30, the external air Ex3 taken in by the intake fan 55 is heated and expanded into the heated air Ah by the heat exchanger 95. The heated air Ah guided to the turbocharger 50 drives the turbocharger 50 and causes the turbocharger 50 to take in the external air Ex2. According to the aircraft 1 of the present disclosure, it is possible to effectively utilize thermal energy of the combustion gas Gc used for driving of the turbine 30 and improve the efficiency of the gas turbine system 100.

The aircraft 1 according to the present disclosure includes the bypass unit 80A that guides a part of the combustion gas Gc guided to the exhaust unit 60 to the intake fan 55, and the intake fan 55 is driven by the combustion gas Gc guided by the bypass unit 80A. According to the aircraft 1 of the present disclosure, a part of the combustion gas guided to the exhaust unit 60 is guided to the intake fan 55 by the bypass unit 80A, and thereby the intake fan 55 can be driven.

The aircraft 1 according to the present disclosure includes the exit unit 90 that guides the heated air Ah guided to the turbocharger 50 by the introduction unit 80B to the discharge port 91a provided in the surface of the nacelle 70.

Since the discharge port 91a is provided in the surface of the nacelle 70, the heated air Ah flowing out of the discharge port 91a flows toward downstream in the flow direction of external air along the surface of the nacelle 70. Accordingly, boundary layer control takes place on the surface of the nacelle 70, and it is thus possible to suppress a failure such as separation of the external air flow from the surface of the nacelle 70 or otherwise turbulence of the external air flow.

Other Embodiments

Although the turbocharger 50 has been described above as a crossflow fan that draws air into an impeller and then discharges the air, other forms may be employed. For example, a modified example using an axial-flow fan that rotates on an axis line and causes air to flow along the axis line may be employed.

Figure 9:
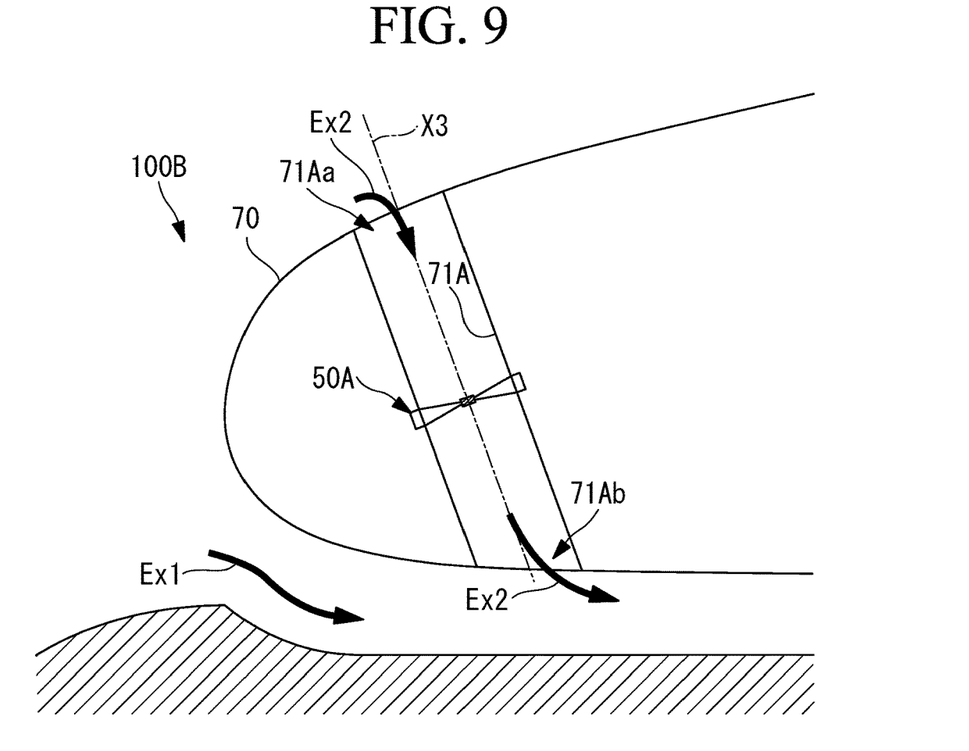
FIG. 9 is a sectional view illustrating a gas turbine system including a turbocharger according to a modified example.

FIG. 9 is a sectional view illustrating a gas turbine system 100B including a turbocharger 50A according to a modified example. As illustrated in FIG. 9, the turbocharger 50A rotates about the axis line X3. Rotation of the turbocharger 50 guides outside air near the outside air inlet port 71Aa to the turbocharger channel 71A. The external air Ex2 taken into the turbocharger 50 is discharged to an outside air supply port 71Ab. The external air Ex2 discharged to the outside air supply port 71Ab is guided to the compressor 10 together with the external air Ex1 introduced from the front of the nacelle 70.

Figure 10:
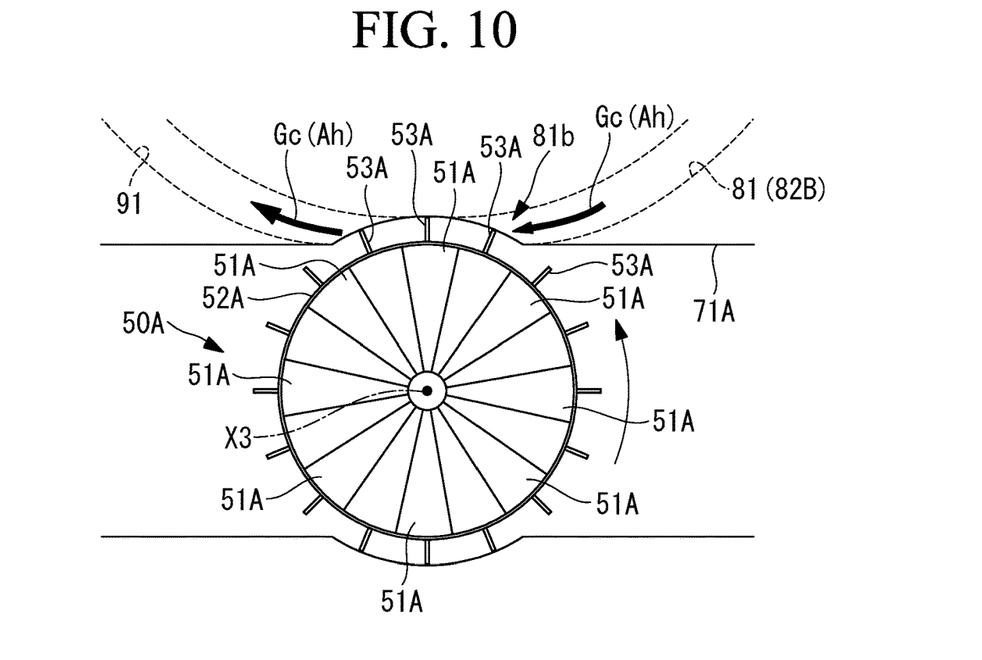
FIG. 10 is a diagram of the turbocharger illustrated in FIG. 9 when viewed along a rotation axis.

FIG. 10 is a diagram of the turbocharger 50A illustrated in FIG. 9 when viewed along the axis line X3 that is a rotation axis. As illustrated in FIG. 10, the turbocharger 50A has a plurality of blades 51A spaced apart in a plurality of portions about the axis line X3, an edge 52A formed in substantially a cylindrical shape about the axis line X3, and a plurality of plate-like members 53A extending outward from the outer circumferential surface of the edge 52A. The turbocharger 50A is fixed to the turbocharger channel 71A by a fastener (not illustrated) rotatably about the axis line X3.

As illustrated in FIG. 10, in the modified example of the first embodiment, the combustion gas Gc guided to the supply part 81b of the bypass channel 81 collides with the plate-like members 53A and thereby rotates the turbocharger 50A about the axis line X3. The combustion gas Gc that has passed through the turbocharger 50A flows into the exit channel 91 and is discharged from the discharge port 91a to the outside. Further, in the modified example of the second embodiment, the heated air Ah guided to the second channel 82B collides with the plate-like member 53A and thereby rotates the turbocharger 50A about the axis line X3. The heated air Ah that has passed through the turbocharger 50A flows into the exit channel 91 and is discharged from the discharge port 91a to the outside.

The gas turbine system of each embodiment described above is understood as follows, for example.

A gas turbine system (100) according to the present disclosure is used for a moving body (1) including a thrust generator (200) configured to generate thrust from electric power and includes: a compressor (10) that compresses external air to generate compressed air; a combustor (20) that burns the compressed air generated by the compressor (10) together with fuel to generate a combustion gas; a turbine (30) driven by the combustion gas generated by the combustor (20); a generator (40) that is coupled to the turbine (30) to generate electric power by driving of the turbine (30) and supplies electric power to the thrust generator (200); a turbocharger (50) that guides external air to the compressor (10); and an exhaust unit (60) that guides a combustion gas that passed through the turbine (30) to the outside, and the turbocharger (50) is driven by a part of a combustion gas guided to the exhaust unit (60) or by external air heated by heat exchange with a part of a combustion gas guided to the exhaust unit (60).

According to the gas turbine system (100) of the present disclosure, the turbine (30) is driven by the combustion gas (Gc) generated by the combustor (20), and the generator (40) coupled to the turbine (30) generates electric power by the driving of the turbine (30). The thrust generator (200) generates thrust from electric power generated by the generator (40), and this can impel the moving body (1). Further, the turbocharger (50) is driven by the combustion gas (Gc) used for the driving of the turbine (30), and external air is forcibly guided to the compressor (10). It is therefore possible to effectively utilize kinetic energy of the combustion gas used for the driving of the turbine (30) and improve the efficiency of the gas turbine system (100).

The gas turbine system (100) according to the present disclosure includes a bypass unit (80) that guides a part of a combustion gas (Gc) guided to the exhaust unit (60) to the turbocharger (50), and the turbocharger (50) is driven by the combustion gas (Gc) guided by the bypass unit (80). According to the gas turbine system (100) of the present disclosure, it is possible to drive the turbocharger (50) by guiding a part of the combustion gas (Gc) guided to the exhaust unit (60) to the turbocharger (50) by the bypass unit (80).

The gas turbine system (100) according to the present disclosure includes: a shell (70) arranged so as to cover the compressor (10), the combustor (20), the turbine (30), and the exhaust unit (40); and an exit unit (90) that guides a combustion gas guided to the turbocharger (50) by the bypass unit (80) to a discharge port (91a) provided in the surface of the shell (70).

Since the discharge port (91a) is provided in the surface of the shell (70), the combustion gas (Gc) flowing out of the discharge port (91a) flows toward downstream in the flow direction of external air along the surface of the shell (70). Accordingly, boundary layer control takes place on the surface of the shell (70), and it is thus possible to suppress a failure such as separation of the external air flow from the surface of the shell (70).

The gas turbine system (100) according to the present disclosure includes: a heat exchanger (95) that exchanges heat between external air (Ex3) and a combustion gas (Gc); an intake fan (55) that guides external air (Ex3) to the heat exchanger (95); a bypass unit (80A) that guides a part of the combustion gas (Gc) guided to the exhaust unit (60) to the heat exchanger (95); and an introduction unit (80B) that guides, to the turbocharger (50), heated air (Ah) generated by heating external air (Ex3) with a combustion gas at the heat exchanger (95), and the turbocharger (50) is driven by the heated air (Ah) guided by the introduction unit (80B).

According to the gas turbine system (100) of the present disclosure, due to the combustion gas (Gc) that has passed through the turbine (30), the external air (Ex3) taken in by the intake fan (55) is heated and expanded into the heated air (Ah) by the heat exchanger (95). The heated air (Ah) guided by the turbocharger (50) drives the turbocharger (50) to cause the turbocharger (50) to take in the external air (Ex2). According to the gas turbine system (100) of the present disclosure, it is possible to effectively utilize thermal energy of the combustion gas (Gc) used for the driving of the turbine (30) and improve the efficiency of the gas turbine system (100).

The gas turbine system (100) according to the present disclosure includes a bypass unit (80A) that guides a part of the combustion gas (Gc) guided to the exhaust unit (60) to the intake fan (55), and the intake fan (55) is driven by a combustion gas (Gc) guided by the bypass unit (80A). According to the gas turbine system (100) of the present disclosure, a part of the combustion gas guided to the exhaust unit (60) is guided to the intake fan (55) by the bypass unit (80A), and thereby the intake fan (55) can be driven.

The gas turbine system (100) according to the present disclosure includes: a shell (70) arranged so as to cover the compressor (10), the combustor (20), the turbine (30), and the exhaust unit (60); an exit unit (90) that guides the heated air (Ah) guided to the turbocharger (50) by the introduction unit (80B) to a discharge port (91a) provided in the surface of the shell (70).

Since the discharge port (91a) is provided in the surface of the shell (70), the heated air (Ah) flowing out of the discharge port (91a) flows toward downstream in the flow direction of external air along the surface of the shell (70). Accordingly, boundary layer control takes place on the surface of the shell (70), and it is thus possible to suppress a failure such as separation of the external air flow from the surface of the shell (70).

In the gas turbine system (100) according to the present disclosure, the exhaust unit (60) has an inner wall member (61) formed in a cylindrical shape and extending along an axis line (X1) about which the turbine (30) rotates and an outer wall member (62) formed in a cylindrical shape and extending along the axis line (X1) and arranged so as to surround the outer circumference side of the inner wall member (61), the inner wall member (61) and the outer wall member (62) form an annular channel (63) through which a combustion gas discharged from the turbine (30) flows and which extends along the axis line (X1), the generator (40) is arranged in an accommodation space (S1) formed on the inner circumference side of the inner wall member (61), and the bypass unit (80) introduces a part of a combustion gas from the annular channel (63).

According to the gas turbine system (100) of the present disclosure, since the generator (40) is arranged in the accommodation space (S1) formed on the inner circumference side of the inner wall member (61) provided to the exhaust unit (60), the generator (40) can be arranged in a space through which no combustion gas flows. Further, a part of the combustion gas can be introduced from the annular channel (63) to the bypass unit (80).

The moving body of the present embodiment described above is understood as follows, for example.

A moving body (1) according to the present disclosure includes: the gas turbine system (100) according to any one of the above; and a thrust generator (200) that generates thrust from electric power generated by the gas turbine system (100).

According to the moving body (1) of the present disclosure, in the gas turbine system (100) used for the moving body (1) including the generator (40) that generates electric power by driving of the turbine (30) and the thrust generator (200) that generates thrust from electric power, kinetic energy or thermal energy of a combustion gas used for the driving of the turbine (30) can be effectively utilized.

REFERENCE SIGNS LIST

1 aircraft (moving body)
10 compressor
20 combustor
30 turbine
40 generator
50, 50A turbocharger
55 intake fan
60 exhaust unit
61 inner wall member
62 outer wall member
63 annular channel
70 nacelle (shell)
71, 71A turbocharger channel
75 pylon
80, 80A bypass unit
80B introduction unit
81, 81A, 82A bypass channel
81B first channel
82B second channel
90 exit unit
91 exit channel
91*a* discharge port
95 heat exchanger
100, 100A, 100B gas turbine system
200 electric fan (thrust generator)
Ah heated air
Ex1, Ex2, Ex3 external air
Gc combustion gas
S1 accommodation space
X1, X2, X3 axis line

The invention claimed is:

1. A gas turbine system used for a moving body comprising a thrust generator configured to generate thrust from electric power, the gas turbine system comprising:
   a compressor that compresses external air to generate compressed air;
   a combustor that burns the compressed air generated by the compressor together with fuel to generate a combustion gas;
   a turbine driven by the combustion gas generated by the combustor;
   a generator that is coupled to the turbine to generate the electric power by driving of the turbine and supplies the electric power to the thrust generator;
   a turbocharger that guides external air to the compressor;
   an exhaust unit that guides a combustion gas that passed through the turbine to outside,
   a bypass unit that guides a part of the combustion gas guided to the exhaust unit to the turbocharger,
   wherein the turbocharger is directly rotated by the part of the combustion gas guided by the bypass unit, the part of the combustion gas being supplied to the turbocharger through a bypass channel into which the part of the combustion gas flows.

2. The gas turbine system according to claim 1, further comprising:
   a shell arranged so as to cover the compressor, the combustor, the turbine, and the exhaust unit; and
   an exit unit that guides the part of the combustion gas guided to the turbocharger by the bypass unit to a discharge port provided in a surface of the shell.

3. The gas turbine system according to claim 2,
   wherein the exhaust unit has an inner wall member formed in a cylindrical shape and extending along an axis line about which the turbine rotates and an outer wall member formed in a cylindrical shape and extending along the axis line and arranged so as to surround an outer circumferential side of the inner wall member,
   wherein the inner wall member and the outer wall member form an annular channel through which the combustion gas discharged from the turbine flows and which extends along the axis line,
   wherein the generator is arranged in an accommodation space formed on an inner circumferential side of the inner wall member, and
   wherein the bypass unit introduces the part of the combustion gas from the annular channel.

4. The gas turbine system according to claim 1,
   wherein the exhaust unit has an inner wall member formed in a cylindrical shape and extending along an axis line about which the turbine rotates and an outer wall member formed in a cylindrical shape and extending along the axis line and arranged so as to surround an outer circumferential side of the inner wall member,
   wherein the inner wall member and the outer wall member form an annular channel through which the combustion gas discharged from the turbine flows and which extends along the axis line,
   wherein the generator is arranged in an accommodation space formed on an inner circumferential side of the inner wall member, and
   wherein the bypass unit introduces the part of the combustion gas from the annular channel.

5. A moving body comprising:
   the gas turbine system according to claim 1; and
   a thrust generator that generates thrust from the electric power generated by the gas turbine system.

6. A gas turbine system used for a moving body comprising a thrust generator configured to generate thrust from electric power, the gas turbine system comprising:
   a compressor that compresses external air to generate compressed air;
   a combustor that burns the compressed air generated by the compressor together with fuel to generate a combustion gas;
   a turbine driven by the combustion gas generated by the combustor;

a generator that is coupled to the turbine to generate the electric power by driving of the turbine and supplies the electric power to the thrust generator;

a turbocharger that guides external air to the compressor;

an exhaust unit that guides a combustion gas that passed through the turbine to outside;

a heat exchanger that exchanges heat between external air and a part of the combustion gas guided to the exhaust unit;

an intake fan that guides the external air to the heat exchanger;

a bypass unit that guides the part of the combustion gas guided to the exhaust unit to the heat exchanger; and an introduction unit that guides, to the turbocharger, heated air generated by heating the external air with the part of the combustion gas at the heat exchanger, wherein the turbocharger is rotated by the heated air guided by the introduction unit.

7. The gas turbine system according to claim 6, wherein the bypass unit guides, to the intake fan, the part of the combustion gas guided to the exhaust unit, and wherein the intake fan is driven by the part of the combustion gas guided by the bypass unit.

8. The gas turbine system according to claim 7, further comprising:

a shell arranged so as to cover the compressor, the combustor, the turbine, and the exhaust unit; and an exit unit that guides the heated air guided to the turbocharger by the introduction unit to a discharge port provided in a surface of the shell.

9. The gas turbine system according to claim 6, further comprising:

a shell arranged so as to cover the compressor, the combustor, the turbine, and the exhaust unit; and an exit unit that guides the heated air guided to the turbocharger by the introduction unit to a discharge port provided in a surface of the shell.

10. The gas turbine system according to claim 6, wherein the exhaust unit has an inner wall member formed in a cylindrical shape and extending along an axis line about which the turbine rotates and an outer wall member formed in a cylindrical shape and extending along the axis line and arranged so as to surround an outer circumferential side of the inner wall member, wherein the inner wall member and the outer wall member form an annular channel through which the combustion gas discharged from the turbine flows and which extends along the axis line, wherein the generator is arranged in an accommodation space formed on an inner circumferential side of the inner wall member, and wherein the bypass unit introduces the part of the combustion gas from the annular channel.

11. A moving body comprising:

the gas turbine system according to claim 6; and a thrust generator that generates thrust from the electric power generated by the gas turbine system.

\* \* \* \* \*